United States Patent [19]
Kim et al.

[11] Patent Number: 5,987,996
[45] Date of Patent: Nov. 23, 1999

[54] MANIFOLD ABSOLUTE PRESSURE SENSOR FOR INTERNAL COMBUSTION ENGINES

[75] Inventors: Joo-Young Kim, Kyunggi-do; Hyun-Ju Park, Inchun-si; Sang-Jo Lee, Kyunggi-do; Tae-Wook Park, Kyunggi-do; Dae-Hyun Yu, Kyunggi-do, all of Rep. of Korea

[73] Assignee: Kefico Corporation, Kyunggi-Do, Rep. of Korea

[21] Appl. No.: 09/101,157

[22] PCT Filed: Oct. 30, 1997

[86] PCT No.: PCT/KR97/00207

§ 371 Date: Jul. 2, 1998

§ 102(e) Date: Jul. 2, 1998

[87] PCT Pub. No.: WO98/20248

PCT Pub. Date: May 14, 1998

[30] Foreign Application Priority Data

Nov. 5, 1996 [KR] Rep. of Korea ................. 96-38408

[51] Int. Cl.⁶ ........................................... G01L 7/00
[52] U.S. Cl. ................................................. 73/756
[58] Field of Search .............................. 73/706, 714, 756, 73/49.7, 118.1, 119 A, 115; 123/73 R, 442, 478, 494, 520

[56] References Cited

U.S. PATENT DOCUMENTS

| | | | |
|---|---|---|---|
| 4,714,998 | 12/1987 | Bussey et al. | 73/119 A |
| 5,127,373 | 7/1992 | Mochizuki | 73/756 |
| 5,351,548 | 10/1994 | Briggs et al. | 73/119 A |

*Primary Examiner*—William Oen
*Attorney, Agent, or Firm*—Browdy and Neimark

[57] ABSTRACT

A manifold absolute pressure (MAP) sensor for internal combustion engines is disclosed. In the MAP sensor, the top and bottom cases (1, 7) of a sensor housing have a plurality of fitting slots (10) and fitting protrusions (11) at their connection edges respectively and are easily and tightly assembled into a single structure through a mechanical fitting and epoxy bonding process. A plurality of support protrusions (12, 12') are internally formed on each of the top and bottom cases (1, 7) and support each side of the circuit board (5), with the circuit board (5) being positioned under the sensor member (4) and allowing the pressure inlet pipe (4') of the sensor member (4) to pass through. A supporting ring (13) and an O-ring (14) are commonly fitted over the pressure inlet pipe (4') of the sensor member (4) and are closely fitted into the enlarged top end of the pressure inlet port (8).

2 Claims, 2 Drawing Sheets though the gap. In addition, the epoxy bond 24, which is interiorly applied onto the junction, generates gas during a hot drying process for the bond 24 and allows the gas to remain in the housing. The above-mentioned moisture, impurities and gas may contaminate and break the parts in the sensor housing, thus causing an operational trouble of the sensor and reducing the operational precision of the sensor while sensing the pressure in a cylinder.

MANIFOLD ABSOLUTE PRESSURE SENSOR FOR INTERNAL COMBUSTION ENGINES

TECHNICAL FIELD

The present invention relates, in general, to a manifold absolute pressure (MAP) sensor installed in a suction manifold of an internal combustion engine and used for sensing the internal pressure of a cylinder, thus allowing mixed gas to be appropriately fed into the cylinder of the engine in response to the operation of a fuel control valve and maintaining a stable operation of the engine and, more particularly, to a MAP sensor capable of being assembled through a mechanical fitting and bonding process, thus having both a clear appearance and a high vibration resistance free from forming any crack on the sensor housing even in the event of external impact being applied onto the sensor.

BACKGROUND OF THE INVENTION

As well known to those skilled in the art, a manifold absolute pressure (MAP) sensor is installed in a suction manifold of an internal combustion engine and is used for auxiliarily controlling suction timing of mixed gas into a cylinder by sensing the internal pressure of the cylinder and outputting a signal, indicative of the loaded condition of the engine, to an electronic control unit (ECU) for the engine. Such a MAP sensor thus allows the mixed gas to be appropriately fed into the cylinder in response to the operation of a fuel control valve and maintains a stable operation of the engine.

FIG. 3 is a sectional view showing the construction of a known MAP sensor for internal combustion engines. As shown in the drawing, the housing of the known MAP sensor is comprised of two parts, that is, a top case 20 and a bottom case 21 which are integrated into a single structure. The bottom case 21, having a pressure inlet port 22 on its bottom, is provided with a fitting groove on its top surface, thus being integrated with the top case 20, with the lower edge of the top case 20 being fitted into the groove 23. After the lower edge of the top case 20 is fitted into the groove 23, a thermosetting epoxy bond 24 is uniformly applied onto the junction between the two cases 20 and 21, thus fixing the top case 20 onto the bottom case 21. However, the epoxy bond 24 is applied onto the inside and outside of the junction between the two cases 20 and 21. In order to define a space for the epoxy bond 24 at the junction, the width of the fitting groove 23 is larger than the thickness of the lower edge of the top case 21, thus allowing the top case 20 to be moved on the bottom case 21 in the event of the bond 24 being not applied onto the junction. Therefore, the known MAP sensor may fail to be precisely assembled and it is very difficult to assemble the sensor, thus reducing productivity of the MAP sensors. The epoxy bond 24 is exposed to the outside of the housing, thus spoiling the appearance of the sensor. The integration of the two cases 20 and 21 is accomplished by applying the bond 24 onto the junction between the two cases 20 and 21 and the sensor housing regrettably has a structural limit with a low vibration resistance. Therefore, the known MAP sensor may fail to effectively resist an external impact and may be easily cracked due to such an impact.

The fitting groove 23 is formed on the top surface of the bottom case 21. Therefore, when a gap is unexpectedly formed in the bonding line at the junction between the top and bottom cases 20 and 21, it is possible to allow moisture or impurities to be introduced into the sensor housing through the gap. In addition, the epoxy bond 24, which is interiorly applied onto the junction, generates gas during a hot drying process for the bond 24 and allows the gas to remain in the housing. The above-mentioned moisture, impurities and gas may contaminate and break the parts in the sensor housing, thus causing an operational trouble of the sensor and reducing the operational precision of the sensor while sensing the pressure in a cylinder.

In the housing of the above sensor, both a sensor member 25 and a circuit board 26 fail to be stably supported because both the member 25 and the board 26 are supported only by a fitting force of the sensor member 25, which is fitted into the pressure inlet port 23 of the bottom case 21. Therefore, both the sensor member 25 and the circuit board 26 may be easily moved and cause a crack at the bonded junction of the housing in the event of external vibrations being applied onto the sensor.

DISCLOSURE OF THE INVENTION

Accordingly, the present invention has been made keeping in mind the above problems occurring in the prior art, and an object of the present invention is to provide a MAP sensor for internal combustion engines, of which the top and bottom cases have a plurality of fitting slots and fitting protrusions at their connection edges respectively and are easily and tightly assembled into a single structure through a mechanical fitting and epoxy bonding process, thus completely sealing the housing, preventing damage of the parts in the housing, improving the assembling effect of the sensor, completely hiding the bond from the outside, improving the appearance of the sensor, giving a high vibration resistance to the sensor, and allowing the sensor to be free from any crack even in the event of external impact.

In order to accomplish the above object, the present invention provides a manifold absolute pressure sensor for internal combustion engines, comprising a pressure sensor member having a pressure inlet pipe on its bottom center, a circuit board electrically connected to the sensor member, a housing receiving both the sensor member and the circuit board therein and being formed by integrating top and bottom cases into a single structure, the top case being integrated with a connector having a plurality of connection pins, and the bottom case being provided with a pressure inlet port, the pressure inlet port being concentric with the pressure inlet pipe of the sensor member, wherein the improvement comprises: the top and bottom cases being integrated with each other at their connection edges, one of the connection edges being partially prominent and the other being partially depressed so as to engage with the partially prominent connection edge; a plurality of support protrusions being internally integrated on each of the top and bottom cases and being adapted for supporting each side of the circuit board, with the circuit board being positioned under the sensor member and allowing the pressure inlet pipe of the sensor member to pass through; a support ring and an O-ring commonly fitted over the pressure inlet pipe of the sensor member at a position under the circuit board; and the pressure inlet port of the bottom case being partially enlarged at its top end, thus allowing both the support ring and the O-ring to be closely fitted into the enlarged top end.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
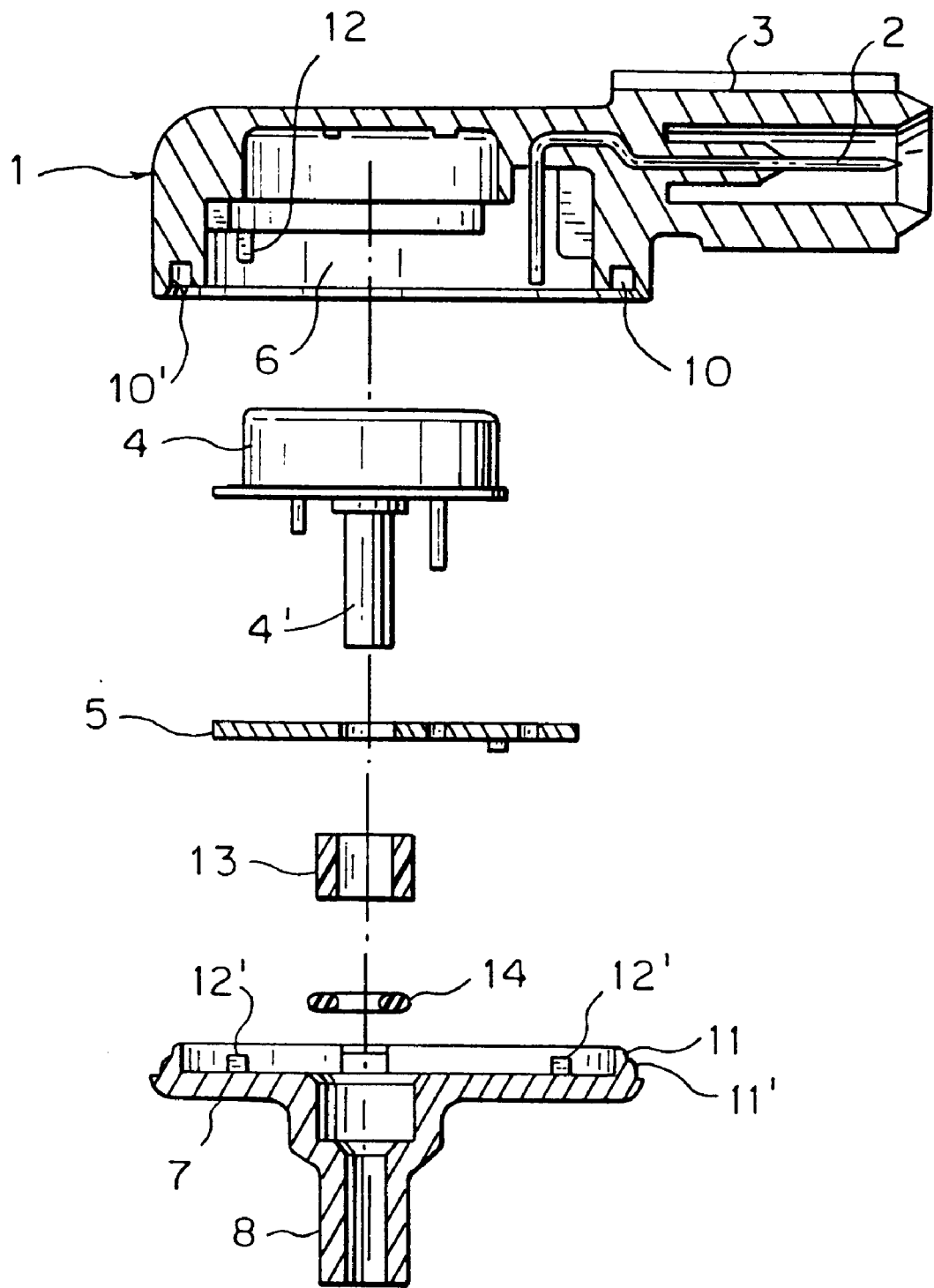
FIG. 1 is an exploded sectioned view showing the construction of a MAP sensor for internal combustion engines in accordance with the preferred embodiment of the present invention.
Figure 2:
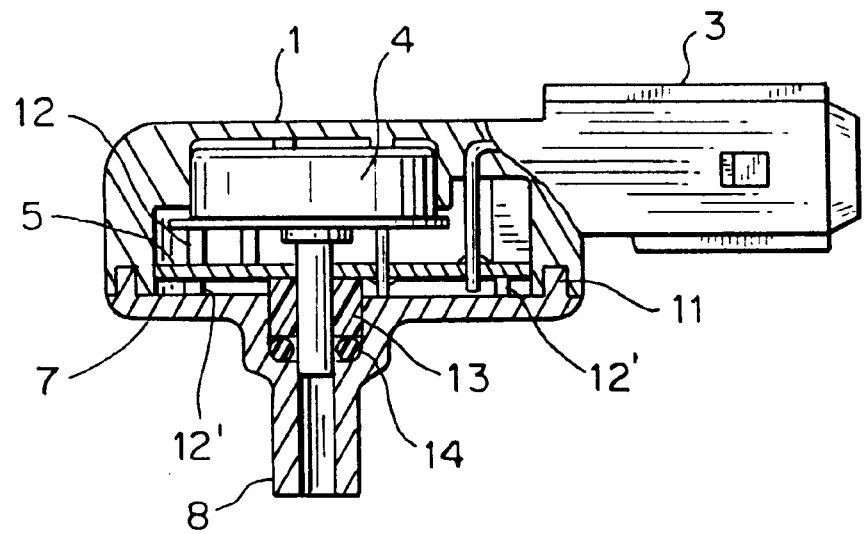
FIG. 2 is a partially broken sectioned view of the MAP sensor of FIG. 1, with the parts of the sensor being assembled into a single structure.
Figure 3:
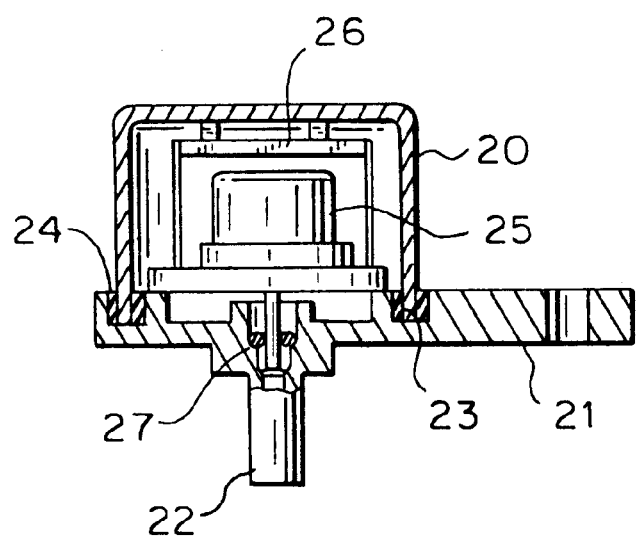
FIG. 3 is a sectional view showing the construction of a known MAP sensor for internal combustion engines.

FIG. 1 is an exploded sectioned view showing the construction of a MAP sensor for internal combustion engines in accordance with the preferred embodiment of this invention. FIG. 2 is a partially broken sectioned view of the MAP sensor of FIG. 1, with the parts of the sensor being assembled into a single structure.

As shown in the drawings, the housing of the MAP sensor of this invention is comprised of two parts, that is, top and bottom cases 1 and 7 which are integrated into a single structure. Integrated with the top case 1 at one side of the case is a connector 3, which is provided with a plurality of connection pins 2. The top case 1, with the connector 3, defines an internal cavity 6 for receiving both a sensor member 4 and a circuit board 5 therein. The circuit board 5 is positioned under the sensor member 4 and is electrically connected to the member 4. Meanwhile, the bottom case 7 is provided with a pressure inlet port 8 on its bottom.

A plurality of fitting slots 10 are regularly formed on the lower end surface of the top case 1, while a plurality of fitting protrusions 11 are regularly formed on the top edge of the bottom case 7 at positions corresponding to the fitting slots 10. Each of the fitting protrusions 11 is tightly fitted into an associated fitting slot 10, with the outside wall 11' of each fitting protrusion 11 being brought into frictional contact with the inside wall 10' of an associated fitting slot 10.

A plurality of support protrusions 12 and 12' are integrally formed on the top and bottom cases 1 and 7, thus supporting both sides of the circuit board 5 and maintaining the position of the circuit board 5 in the housing, respectively. A pressure inlet pipe 4' of the sensor member 4, which is concentric with the pressure inlet port 8 of the bottom case 7, passes downwardly through the center opening of the circuit board 5, with a support ring 13 and an O-ring 14 being fitted over the pipe 4' in that order. Both the support ring 13 and the O-ring 14 are tightly fitted into the enlarged top end of the pressure inlet port 8 and so the outside walls of the two rings 13 and 14 come into close contact with the inside wall of the pressure inlet port 8. The support ring 13 holds both the circuit board 5 and the O-ring 14 at its top and bottom ends.

The operational effect of the above MAP sensor will be described hereinbelow.

In the same manner as that described for the known MAP sensor, the MAP sensor of this invention is installed in a suction manifold of an internal combustion engine and is used for auxiliarily controlling suction timing of mixed gas into a cylinder by sensing the internal pressure of the cylinder and outputting a signal indicative of the loaded condition of the engine to an electronic control unit (ECU) for the engine. Such a MAP sensor thus maintains a stable operation of the engine.

In order to assemble the MAP sensor of this invention, an appropriate amount of bond is uniformly applied onto the total length of each fitting slot 10 of the top case 1 prior to fitting the fitting protrusions 11 of the bottom case 7 into the fitting slots 10, thus completely assembling the sensor. In such a case, the outside wall 11' of each fitting protrusion 11 is brought into close contact with the inside wall 10' of an associated fitting slot 10, thus effectively preventing the two cases 1 and 7 from relatively moving at the junction and preventing the bond from flowing into the outside of the fitting slots 10. It is possible to easily and precisely assemble the sensor, thereby improving productivity of MAP sensors.

INDUSTRIAL APPLICABILITY

In the MAP sensor of this invention, the integration force of the two cases 1 and 7 is doubled since the two cases 1 and 7 is primarily integrated with each other by mechanically fitting the protrusions 11 of the bottom case 7 into the slots 10 of the top case 1 and are finally integrated with each other by the thermosetting epoxy bond. Therefore, the sensor of this invention effectively resists vibrations caused by external impact and has a high durability.

In addition, each of the fitting protrusions 11 is tightly fitted into an associated fitting slot 10 with the outside wall of each protrusion 11 being brought into tight contact with the inside wall of an associated slot 10. Therefore, the sensor of this invention is free from any introduction of moisture or impurities into the housing even in the event of a gap being unexpectedly formed in the bonding line of the housing. The sensor of this invention almost completely prevents the thermosetting epoxy bond from remaining in the sensor housing and so the sensor effectively reduces the amount of gas, which is generated and remains in the housing during a hot drying process for the bond. In a brief description, the sensor of this invention is almost completely free from moisture, impurities or gas, which may contaminate and break the parts in the housing. Therefore, it is possible to prevent an operational trouble of the sensor and to improve the operational precision of the sensor while sensing the pressure in a cylinder.

The circuit board 5 of this sensor, with the sensor member 4, is stably supported by the support protrusions 12 and 12' of the two cases 1 and 7 at its both sides unlike the typical supporting structure in which the circuit board is unstably supported by the sensor member fitted into the pressure inlet port of the bottom case.

Another advantage of the sensor of this invention resides in that the support ring 13 always presses the O-ring 14 downwardly in the pressure inlet port of the bottom case 7, thus almost completely preventing a movement of the O-ring 14 even in the event of external vibrations being applied onto the sensor. Therefore, the sensor is free from pressure leakage from the housing and improves its operational precision while sensing the pressure in a cylinder.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A manifold absolute pressure sensor for internal combustion engines, comprising a pressure sensor member having a pressure inlet pipe on its bottom center, a circuit board electrically connected to said sensor member, a housing receiving both the sensor member and the circuit board therein and being formed by integrating top and bottom cases into a single structure, said top case being integrated with a connector having a plurality of connection pins, and said bottom case being provided with a pressure inlet port being concentric with the pressure inlet pipe of the sensor member, wherein the improvement comprises:

the top and bottom cases being integrated with each other at their connection edges, one of said connection edges being partially prominent and the other being partially depressed so as to engage with the partially prominent connection edge;

a plurality of support protrusions being internally integrated on each of the top and bottom cases and being adapted for supporting each side of said circuit board, with the circuit board being positioned under the sensor member and allowing the pressure inlet pipe of the sensor member to pass through;

a support ring and an O-ring commonly fitted over the pressure inlet pipe of the sensor member at a position under the circuit board; and the pressure inlet port of the bottom case being partially enlarged at its top end, thus allowing both the support ring and the O-ring to be closely fitted into the enlarged top end.

2. The manifold absolute pressure sensor according to claim 1, wherein a plurality of fitting slots are regularly formed on the connection edge of said top case and a plurality of fitting protrusions are regularly formed on the connection edge of the bottom case at positions corresponding to the fitting slots, each of said fitting protrusions being tightly fitted into an associated fitting slot with the outside wall of each fitting protrusion being brought into close contact with the inside wall of an associated fitting slot.

* * * * *